May 28, 1957     R. MORETTI, SR     2,794,083
TIRE PRESSURE SIGNAL SWITCH DEVICE
Filed July 28, 1953
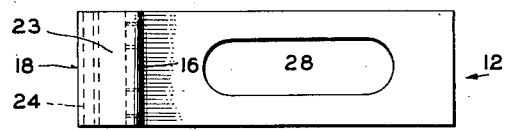
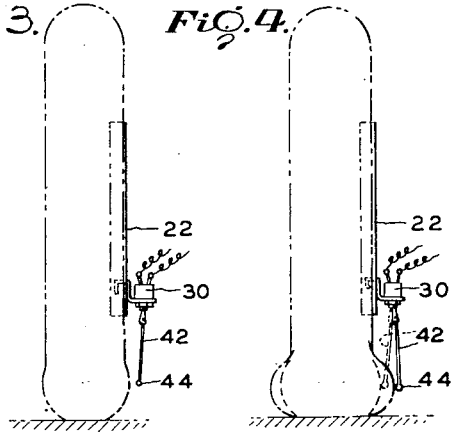
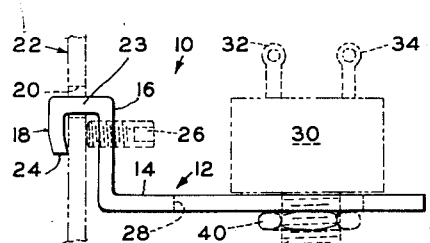
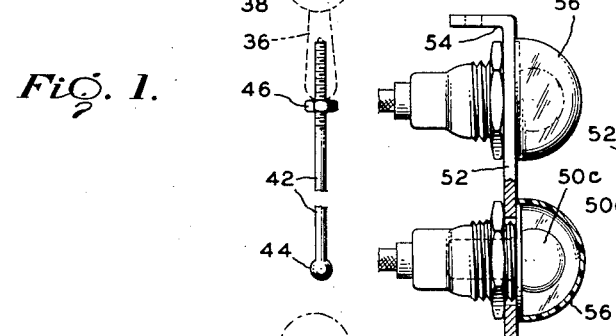
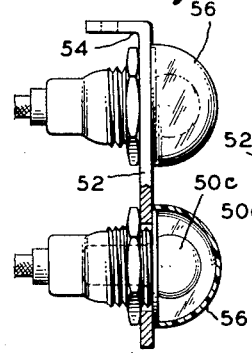
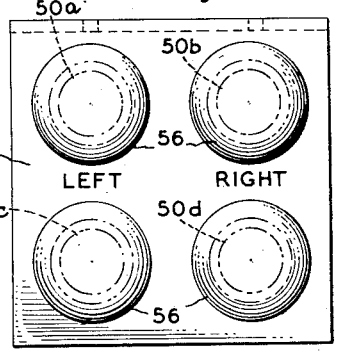
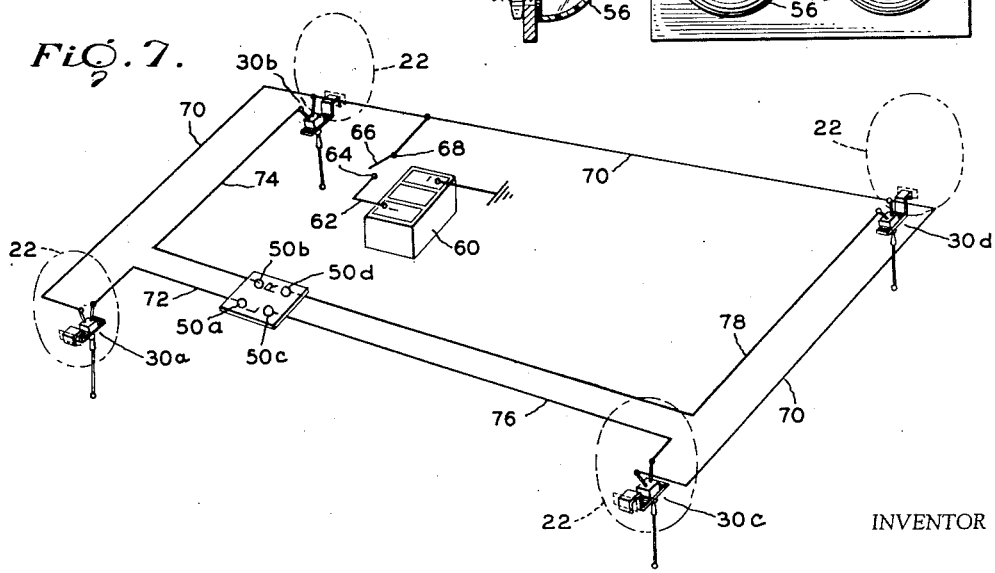
INVENTOR
Raymond Moretti, Sr.
BY Gustave Miller
ATTORNEY

United States Patent Office 2,794,083
Patented May 28, 1957

2,794,083

TIRE PRESSURE SIGNAL SWITCH DEVICE

Raymond Moretti, Sr., Miami Springs, Fla., assignor to Gustave Miller, Washington, D. C.

Application July 28, 1953, Serial No. 370,711

1 Claim. (Cl. 200—61.23)

This invention relates to indicating devices and systems and more particularly to an indicating device and system for warning the driver of a motor vehicle of an unsafe pressure condition of a pneumatic tire.

It is important from the standpoints of both tire economy and of safety, that the driver of an automotive vehicle know when the pressure of any one of the tires has dropped below a predetermined desirable operating value. Low tire pressure greatly accelerates the wear on tires and also creates a driving hazard. While various devices are known for detecting unsafe tire pressure conditions, most of these devices are complicated in their operation and are frequently difficult to attach in proper detecting position on the automotive vehicle.

Accordingly, it is an object of this invention to provide a simple and easily installed device for automatically indicating when the pressure of any one of the pneumatic tires of an automotive vehicle drops below a predetermined desired value.

It is a further object of this invention to provide a simple and sturdy mounting arrangement for a pressure detection device adjacent each pneumatic tire.

It is another object of the invention to provide a pressure detection device for pneumatic tires which can be manufactured economically and sold at a reasonable price.

It is still another object of this invention to provide a low pressure detection system for the tires of an automotive vehicle in which the driver of the vehicle is instantly advised which one of the tires has a deflated condition.

In accordance with these objectives, this invention provides a tire pressure indicating device which comprises a mounting bracket having a channel shaped end portion which passes through the brake adjusting slot generally provided on the brake drums of modern automotive vehicles in such manner as to permit clamping the bracket member against the inner surface of the brake drum. The bracket supports a switch member of the momentary or microswitch type having a downwardly depending operating rod which is normally maintained out of engagement with the tire, but which engages the tire when the tire reaches a predetermined degree of deflation. A separate detection device is used for each tire. When any one of the tires of the automotive vehicle equipped with the pressure detection means loses pressure to a sufficient degree to actuate the detection means located adjacent that tire, the switch operated by the particular detection means is closed, thereby closing the electrical circuit of a suitable signalling means, such as a signal light mounted adjacent the dashboard or panel of the automotive vehicle. A separate signal light is provided for each tire, so that the driver knows instantly which tire has the low pressure condition.

The features of this invention which are believed to be novel are set forth with particularity in the appended claim. The invention, itself, however, both as to its organization and use, together with further objects and advantages thereof, may best be understood by reference to the following description taken in connection with the accompanying drawing in which:

Fig. 1 is a side elevation of the low pressure detection means, including the support bracket member, the momentary or microswitch supported by the bracket member, and the switch operating rod, which is actuated by the tire;

Fig. 2 is a top plan view of the bracket member which supports the switch;

Fig. 3 is a front elevation of a wheel equipped with the tire pressure indicating device of the invention, showing a tire in normal inflated condition;

Fig. 4 is a view similar to Fig. 3, showing the same tire with a dangerously low pressure condition, and the manner in which such pressure condition causes the signalling device to be actuated;

Fig. 5 is a side elevation view of the panel member which supports the signal lights which indicate a low pressure condition of the respective tires;

Fig. 6 is a front elevation view of the panel of Fig. 5;

Fig. 7 is a diagrammatic perspective view of the wiring arrangement for the low pressure indicating device of the invention.

Referring now to the drawings, there is shown in Fig. 1 the low pressure detection device generally indicated at 10, which comprises a bracket member 12 having a substantially flat base portion 14 and a vertically extending portion 16 which terminates in a generally channel-shaped portion generally indicated at 18. The channel-shaped portion 18 is adapted to pass through the brake adjusting slot 20 which is conventionally provided on the brake drum 22 of modern automotive vehicles. The channel-shaped portion 18 comprises a laterally extending portion 23 which extends substantially perpendicularly to the plane of the vertically extending portion 16 of the bracket and a lip portion 24 which extends substantially perpendicularly downwardly from the outer edge of portion 23. The laterally extending portion 23 passes through slot 20 so that the downwardly depending lip 24 of the bracket is positioned adjacent the inside surface of the brake drum 22, while the vertical portion 16 of the bracket is positioned adjacent the exterior surface of the brake drum.

As will be seen in Fig. 1, the lip portion 24 of the bracket is drawn up tightly against the inner surface of the wall of brake drum 22 by means of two screws 26, which pass through the vertical portions 16 of the bracket, the screws being tightened against the outer surface of the brake drum 22. The screws 26 may be of the well known "Allen" type which are tightened by means of an Allen wrench.

The bracket member 12 is provided with an elongated slot 28 (Fig. 2) which receives a switch assembly 30 operated by a downwardly depending toggle element 36. The switch 30 is of the momentary or microswitch type in which a switch element located internally of the switch bridges the terminals 32 and 34 as long as the switch actuating member of toggle element 36 is physically displaced by a predetermined amount from a given neutral position. The switch 30 is provided with a threaded stud portion 38 which passes through the aperture 28 of the bracket member 12. A nut 40 is tightened on the threaded stud portion 38 up against the underneath surface of bracket 12 to maintain the switch member 30 rigidly in position with respect to the bracket 12.

The switch 30 is operated by motion of a toggle element 36 which, in turn, is operated by a downwardly depending rod member 42 moved by the tire upon a predetermined degree of deflation of the tire. The switch operating element or toggle 36 is provided with a threaded bore into which the threaded end of rod member 42 is screwed to a predetermined degree depending upon the particular tire with which the detection device is being used. The rod member 42 is made of spring steel wire or similar material and terminates at its outer end in a metal ball element 44. The rod 42 with its ball element 44 forms the sensing element which is physically actuated by the tire when the tire reaches a given degree of deflation. A lock nut member 46 is tightened up against the outer end of the toggle element 36 to maintain the sensing rod 42 in a given adjusted position.

The relation of the pressure detection device to the tire is best shown in Fig. 3. The sensing rod 42 should be adjusted so that the ball 44 is approximately at the center of the normal height of the tire when the tire is at its correct inflation. Also, the detecting device should be so adjusted that the ball 44 at the outer end of rod 42 is approximately one-quarter inch from the outer surface of the tire when the tire is at its normal degree of inflation.

As can be seen in the view of Fig. 4, when the tire loses pressure and begins to bulge outwardly, the outer surface of the tire contacts the ball 44 at the end of the sensing rod 42. The switch device 30 is adjusted just at the breaking point so that a very slight movement of the sensing rod 42 moves the switch to a closed portion. Thus, movement of the rod 42 from its normal position as shown in Fig. 3 to the full-line position shown in Fig. 4 causes the switch 30 to close and to remain closed as long as the tire remains in the low pressure condition. As will be explained later, closure of the switch 30 causes one of the lights shown in Figs. 5 and 6 to be illuminated provided the ignition switch of the car is closed. This permits the driver of the vehicle to instantly ascertain which tire has the low pressure condition.

As will be seen in Figs. 5 and 6, the signal lights 50a, b, c, and d are supported by a panel 52 which may be attached in any suitable manner to the dashboard or panel of the automotive vehicle. The panel 52 is provided at its upper portion with a bent portion or surface 54, which is substantially perpendicular to the vertical portion of the panel 52. The horizontal or bent portion 54 may be provided with holes to provide passages for fastening means to permit attachment of the light panel to the dashboard or panel of the car. Obviously, the panel 52 could be attached in any number of ways, and this is merely by way of example. Plastic caps 56 may be provided to fit over the indicating bulbs 50a, b, c, and d, the plastic caps preferably being colored red to instantly attract the attention of the driver of the vehicle and warn him of the improper pressure condition.

As shown in Fig. 6, an indicating signal light 50 is provided for each of the four wheels of the automotive vehicle, each signal light indicating a dangerous pressure condition of one of the tires. Thus, the two upper lights 50a, 50b shown in Fig. 6 may serve as indicators for the left and right front tires, respectively, while the two lower lights 50c and 50d may serve as indicators for the left and right rear tires, respectively.

The electrical wiring arrangement for the low pressure indicating devices of the invention is shown in Fig. 7. As will be seen, the battery 60 of the vehicle has its negative terminal grounded while the positive terminal of the battery is connected by means of conductor 62 to terminal 64 of the ignition switch 66. Terminal 68 of the ignition switch is connected to a conductor 70, which in turn is connected to one terminal of each of the switches 30 at each of the respective tires of the vehicle. The other terminal of each of the switches 30 is connected to one of the respective indicating lights 50. Thus, one terminal of switch 30a, which is located adjacent the left front wheel, with respect to view shown in Fig. 7, is connected to the conductor 70, while the other terminal of switch 30a is connected by means of conductor 72 to one terminal of signal light 50a. Similarly, one terminal of switch 30b, which is positioned adjacent the right front tire, is connected to the conductor 70, while the other terminal of switch 30b is connected by means of conductor 74 to one terminal of signal light 50b. In a similar manner, one terminal of switch 30c, which is located adjacent the left rear tire, is connected to conductor 70, while the other terminal of switch 30c is connected by means of conductor 76 to signal light 50c. In a similar manner, one terminal of switch 30d, which is positioned adjacent the right rear tire, is connected to the conductor 70, while the other terminal of switch 30d is connected by means of conductor 78 to one terminal of signal light 50d. The terminal of each of the respective signal lights 50a, b, c, and d, which is not connected to one of the conductors 72, 74, 76, or 78, is connected to ground. For convenience in wiring, different colors may be used to distinguish the different conductors from one another. Thus, for example, conductor 70 may be red, while conductors 72, 74, 76, and 78 may be blue, black, green, and white, respectively.

It will be seen, therefore, that when the ignition switch 66 is closed, a low pressure condition of any of the tires will cause the sensing rod 42 of the respective switch 30 positioned adjacent the respective tire to be actuated in such manner as to close a circuit through the respective switch 30 from the battery through the respective signal light in series with that switch, and thence, to the grounded terminal of the battery. The driver of the vehicle, seeing the lighted signal light, will instantly realize that one of the tires has a low pressure condition and by noting the particular signal light which has been illuminated, will know exactly which one of the four tires has the low pressure condition.

It can be seen in the foregoing that there is provided in accordance with this invention a simple and inexpensive device for indicating a low pressure condition of pneumatic tires on automotive vehicles. The signalling device of the invention is simple in construction and very easily installed. It is obvious that the device of the invention has great practical utility, and provides a timely warning to the driver of an automotive vehicle of a low pressure condition of any one of the tires of the vehicle, thereby avoiding danger of excessive wear on the tires due to such low pressure condition, and also avoiding the possibility of accidents which might possibly be occasioned by the low pressure condition of the tires.

While there has been shown and described a particular embodiment of the invention, it is obvious to one skilled in the art that various changes and modifications can be made without departing from the invention, and, therefore, it is aimed in the appended claim to cover all such changes and modifications as formed within the true spirit and scope of the invention.

Having thus set forth and disclosed the nature of this invention, what is claimed is:

A tire pressure signal switch device comprising a mounting bracket supported by the brake drum of an automotive vehicle, said mounting bracket comprising a base portion having means to receive a switch device, a vertical portion substantially perpendicular to said base portion, a laterally extending portion attached to and extending from the upper end of said vertical portion in an opposite direction to said base portion, and a downwardly depending lip portion attached to the outer edge of said laterally extending portion, said laterally extending portion and said lip portion being receivable through the brake adjusting slot of the brake drum of an automotive vehicle to thereby permit positioning said lip portion interiorly of said brake drum while said vertical portion is positioned exteriorly of said brake drum, with screw means in said vertical portion for tightening said lip portion against an interior wall surface of said brake drum, a switch means supported by said base portion, an operating member connected to said switch, said operating member being disposed adjacent said tire and being movable by said tire to operate said switch when said tire reaches a predetermined degree of deflation.

References Cited in the file of this patent

UNITED STATES PATENTS

| | | |
|---|---|---|
| 2,082,835 | Kelly | June 8, 1937 |
| 2,084,939 | Byron | June 22, 1937 |
| 2,144,286 | Dawson | Jan. 17, 1939 |
| 2,153,896 | Mohar | Apr. 11, 1939 |
| 2,215,120 | Hardy et al. | Sept. 17, 1940 |
| 2,317,509 | Anderson | Apr. 27, 1943 |
| 2,461,299 | Sullivan | Feb. 8, 1949 |
| 2,593,824 | Wilson | Apr. 22, 1952 |
| 2,659,781 | Anderson | Nov. 17, 1953 |